March 2, 1926.

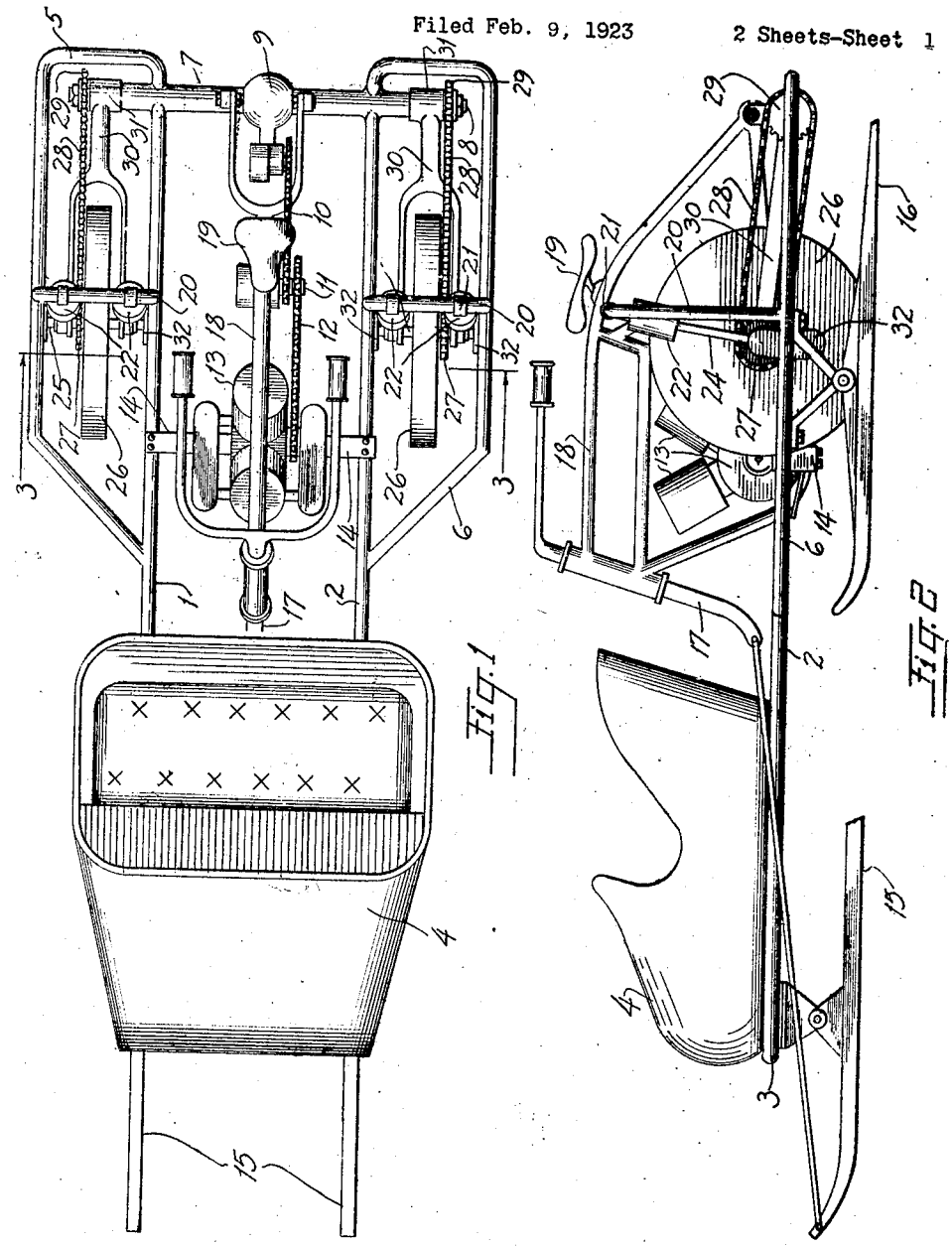

K. J. E. NILSON 1,574,924

MOTOR SLED

Filed Feb. 9, 1923

INVENTOR
K. J. E. Nilson
H. J. Sanders
ATTORNEY

Patented Mar. 2, 1926.

1,574,924

UNITED STATES PATENT OFFICE.

KARL JOHAN ENGELBERT NILSON, OF DETROIT, MICHIGAN.

MOTOR SLED.

Application filed February 9, 1923. Serial No. 618,017.

*To all whom it may concern:*

Be it known that I, KARL J. E. NILSON, a citizen of the Kingdom of Sweden, residing at Detroit, in the county of Wayne and State of Michigan, have invented certain new and useful Improvements in Motor Sleds, of which the following is a specification.

This invention relates to improvements in motor vehicles and more particularly to motor sleds. One object is to provide a motor sled having traction wheels disposed in advance of the drive shaft. Novel shock absorbing means that enable the machine to carry loads of varying weights with the minimum amount of vibration form a further object.

With the foregoing and other objects in view the invention consists in the combination and arrangement of parts to be hereinafter fully described, pointed out in the appended claims and illustrated by the accompanying drawings which form a part of this application and wherein—

Fig. 1 is a top plan view of a motor sled constructed according to the present invention.

Fig. 2 is a view of the machine in side elevation.

Like reference characters denote corresponding parts throughout the several views.

Figure 3:
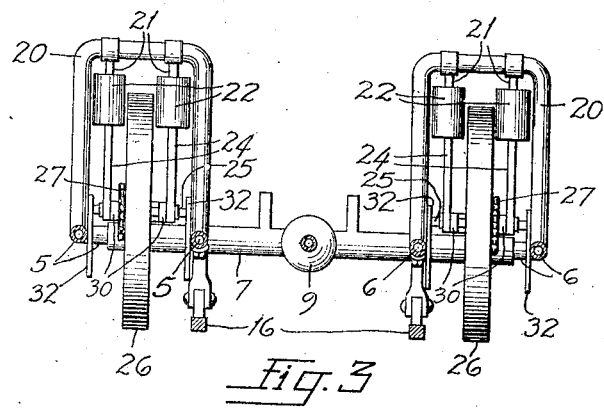
Fig. 3 is a cross section taken on line 3—3 of Fig. 1.
Figure 4:
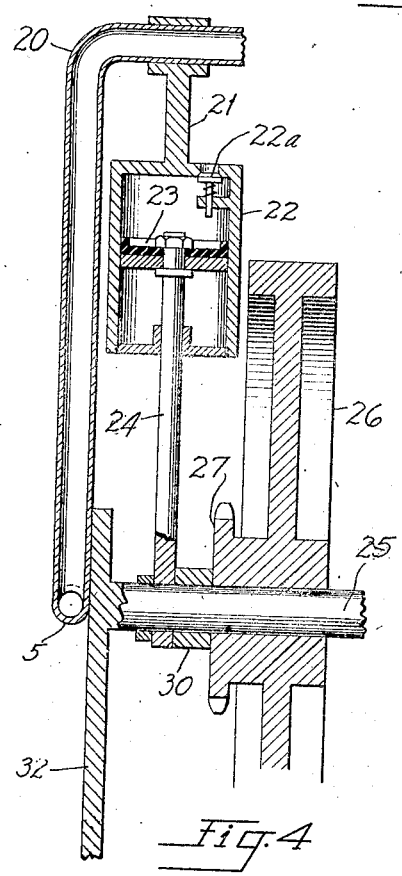
Fig. 4 is a vertical sectional view taken through the rear end of the machine.
Figure 5:
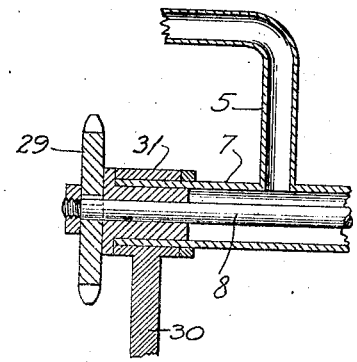
Fig. 5 is an enlarged fragmentary sectional view of the rear end of the machine.

The machine comprises a frame formed of the side portions 1, 2 connected by the rounded front end 3, whereon the seat 4 is supported, and with the looped rear end portions 5, 6 which portions are formed upon relatively remote sides of the frame portions 1, 2. The frame portions 1, 2 are connected by the transverse sleeve 7 wherein the drive axle 8 is journaled that is provided with the differential 9 which is driven through the medium of gearing of standard construction by sprocket chain 10 that is driven from stub shaft 11 that is driven by sprocket chain 12 that is driven by the shaft of the engine 13 supported upon braces 14 secured to the frame portions 1, 2.

The frame of the machine is supported upon the front runners 15 and the rear runners 16. The forks 17 of the bicycle frame 18 are connected to and steer the front runners, said bicycle frame being provided with the usual seat 19 and supported by the said braces 14.

Spanning each looped end portion 5 or 6 and supported thereby is a U-shaped frame 20, standing upright, from the inverted base of which the links 21 depend that carry, and are integral with, the cylinders 22, provided with air valves 22$^a$, wherein the pistons 23 are arranged that are connected by piston rods 24 to the axle 25 of the drive wheel 26, said drive wheels, two in number, are each provided with a sprocket wheel 27 connected by chain 28 with a sprocket wheel 29 on the drive axle 8. Each axle 25 is engaged by the bifurcated end of a fork 30 the opposite end 31 of which is loosely supported upon the sleeve 7.

Each axle 25 at each of its ends is provided with an integral guide shoe 32, disposed at right angles to the axle, which bears against one of the sides of one of the rear end portions 5 or 6 of the frame. In use the motor 13 drives the shaft 8 which through the medium of the sprocket wheels 29, at its ends, connected to sprocket wheels 27 and chains 28 drives the wheels 25 disposed in advance of the said shaft 8 thus propelling the machine. The load carried and imposed upon the said wheels through the medium of the U-shaped frames 20 connected by cushioning means to the axles 25 is, by said cushioning means, saved from excessive vibration by travel over rough roads. As the piston 23 in a cylinder 22 moves toward the lower end of said cylinder air is drawn in through the valve 22$^a$ which air serves as a cushion when the piston tends to move toward the upper end of the cylinder.

What is claimed is:

1. A self-propelled sled comprising in combination with the runners thereof, a frame supported by the runners of the sled, said frame including fixed main and auxiliary side members spaced to form respectively central and lateral looped portions constituting closed gaps, traction wheels carried by the frame and disposed in said lateral looped portions, a motor sustained by and located intermediate of the main members and above the plane of said central loop portion, a power transmitting medium mounted on the frame and arranged in rear of said motor and wheels, and means having driving connection with the motor, the power transmitting medium and said wheels for conveying motion to the latter.

2. A self-propelled sled comprising in combination with its runners, a frame carried by said runners consisting of looped main and side members providing gaps between them, a motor supported by said main members, yokes rising over said gaps, traction wheels operatively maintained within the latter, means for transmitting power from said motor to said wheels, and means connecting the wheels with the upper part of said yokes serving to cushion shocks occuring therebetween.

3. A self-propelled sled comprising in combination with the runners thereof, a frame sustained by the runners of the sled, said frame including rigidly held main and auxiliary side members spaced to form respectively central and lateral fixed gaps between them, a motor supported by said main members, traction wheels mounted independently one of the other within the lateral gaps beyond the runners of the sled, interconnected means extending transversely of said gaps and disposed in rear of said motor and said wheels capable of transmitting power from the former to the latter, and guides coacting with the opposite faces of the main and side members serving to maintain alignment of the wheels within the said gaps, said guides being carried endwise from the axles of said traction wheels.

4. A self-propelled sled comprising in combination with the runners thereof, a frame supported by the runners, said frame consisting of rigidly held main and auxiliary side members spaced to form respectively central and lateral fixed gaps between them, a power transmitting shaft disposed at the rear of said frame and transverse of said gaps, a motor sustained by said main members and positioned in said central gap operatively connected to said shaft, traction wheels in the lateral gaps and yieldably carried by the frame and having driving connection with said shaft, and bifurcated arms extending forwardly from the shaft and embracing and supporting the traction wheels.

5. A self-propelled sled comprising in combination with the runners thereof, a frame sustained from said runners consisting of main and side members forming gaps therebetween, a motor supported by said main members, yokes straddling said gaps, traction wheels within the latter driven from said motor, cushioning means intermediate the axles of said wheels and said yokes, and guides at the ends of said axles bearing against the members of said frame to maintain the wheels in alignment therewith.

6. A self-propelled sled comprising in combination with the runners thereof, a frame sustained from said runners consisting of main and side members forming gaps therebetween, a power transmitting shaft disposed at the rear of said frame, a motor carried by said main members operatively connected up with said shaft, traction wheels receiving motion therefrom located in said gaps, yokes straddling the same, and linkages extending intermediate the upper parts of said yokes and said wheels and between the latter to points coincident with the said shaft.

7. A self-propelled sled comprising in combination with its runners, a frame sustained by the runners of the sled, said frame being constructed of rigidly held main and auxiliary side members spaced to form respectively central and lateral fixed gaps between them, a power transmitting shaft carried by and located at the rear of said frame and disposed transversely of said gaps including a differential mechanism, a motor supported by said main members operatively connected up with said mechanism, a sleeve oscillatably mounted on and surrounding said shaft at opposite ends thereof, arms fixed to and extending to one side of said sleeves and into said lateral gaps, traction wheels mounted adjacent to the forward extremities of said arms, and means for conveying motion to said wheels from the shaft.

8. A self-propelled sled comprising in combination a substantially level frame including rigidly held main and auxiliary side members spaced to form respectively central and lateral fixed gaps, runners supporting said frame at the front and rear ends thereof, traction wheels independently one of the other disposed in said lateral gaps and to one side of the runners at the rear end of the frame, a drive shaft at the rear end of the frame arranged transversely of all of said gaps, a prime mover on the frame and over the central gap having operative connection with said shaft, power transmitting connections extending horizontally and forwardly in said lateral gaps from the shaft to said wheels, a superstructure carried by the main and side members above the plane of the frame and the lateral gaps yieldably sustaining each of said wheels in the last named gaps, and a seat located on the frame over the front runners forward of the prime mover and power transmitting connections.

9. A self-propelled sled including in combination a horizontally disposed skeleton frame composed of main and auxiliary side members spaced to form respectively central and lateral gaps between them, front and rear runners under said main members, traction wheels mounted on opposite sides of said frame in proximity to the rear end thereof within the lateral gaps, a drive shaft journalled on the frame transversely of said gaps, a motor supported on the frame having operative connection with said shaft for rotating the same, power transmitting means between the shaft and said wheels, vertically arranged yokes yieldingly connecting each wheel with the frame independent of said runners above the plane of the side members, and a structure supported on the frame above its central gap having a forked element connected to the front runners for steering the sled.

In testimony that I claim the foregoing as my own I have hereto affixed my signature.

KARL JOHAN ENGELBERT NILSON.